United States Patent [19]
Berkoff et al.

[11] 3,860,716
[45] Jan. 14, 1975

[54] METHODS AND PHARMACEUTICAL COMPOSITIONS FOR INHIBITING GLUCONEOGENESIS

[75] Inventors: Charles E. Berkoff, Huntingdon Valley; Nicholas W. Di Tullio, Holmes, both of Pa.; Jerry A. Weisbach, Cherry Hill, N.J.

[73] Assignee: SmithKline Corporation, Philadelphia, Pa.

[22] Filed: Mar. 13, 1972

[21] Appl. No.: 234,379

Related U.S. Application Data

[63] Continuation-in-part of Ser. No. 131,834, April 6, 1971, abandoned.

[52] U.S. Cl. .................................................. 424/266
[51] Int. Cl. ............................................. A61k 27/00
[58] Field of Search ............. 131/834; 424/263, 266

[56] References Cited
UNITED STATES PATENTS
2,964,560  12/1960  Haack ............................ 424/322 X
3,211,611  10/1965  Clark ................................. 424/230

OTHER PUBLICATIONS

Chemical Abstracts, Vol. 27, 5076, (1933).

Chemical Abstracts, Vol. 70, 36214, (1969); 76158g, (1969); Vol. 72, (1970), 53477d.

Pharmaceutica Acta Helvetiae, 44, 637, (1969).

Primary Examiner—Frederick E. Waddell
Attorney, Agent, or Firm—Richard D. Foggio; William H. Edgerton

[57] ABSTRACT

Pharmaceutical compositions for inhibiting gluconeogenesis which comprise thio substituted picolinic acid derivatives and methods of inhibiting gluconeogenesis by administering internally said compositions to an animal.

5 Claims, No Drawings

METHODS AND PHARMACEUTICAL COMPOSITIONS FOR INHIBITING GLUCONEOGENESIS

This application is a continuation-in-part of application Ser. No. 131,834 filed Apr. 6, 1971, now abandoned.

This invention relates to methods and pharmaceutical compositions for inhibiting gluconeogenesis which thereby reduce the level of blood sugar of animals and result in useful hypoglycemia for the treatment of diabetes. More specifically, the compositions of this invention comprise as the active medicament thio substituted picolinic acid derivatives of the formula:

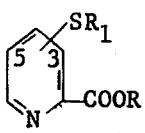

FORMULA I wherein:

R represents hydrogen, methyl or ethyl, preferably hydrogen; and $R_1$ represents hydrogen, acetyl, benzoyl, phenyl or benzyl; with the -$SR_1$ moiety being in the 3 or 5-position of the pyridine ring, preferably the 3-position. A preferred compound for use in this invention is 3-thiolpicolinic acid.

Advantageously the novel pharmaceutical compositions of this invention comprise a nontoxic pharmaceutical carrier and a compound of formula I in a dosage unit form.

The active medicaments of formula I above are either known or are prepared by known synthetic procedures. For example, 3-thiolpicolinic acid is described in ROCZNIKI CHEM., 12, 493(1932); Chem. Abs. 27:5076[2]. It is prepared generally by diazotization of 3-aminopicolinic acid followed by treatment with sodium polysulfide. The disulfide by-product is conveniently reduced to the thiol utilizing hydrazine hydrate. 5-Thiolpicolinic acid obtained from 5-aminopicolinic acid is described in *Pharmaceutica Acta Helvetiae*, 44, 637 (1969).

The thiolpicolinic acids are used to prepare the ester and/or substituted thio derivatives by treatment with the appropriate reactive agent such as, for example methanol (to give the ester), acetic anhydride, benzoyl chloride or benzyl chloride by standard procedures.

The pharmaceutical compositions of this invention are prepared in conventional dosage unit forms by incorporating an amount of a compound of formula I sufficient to inhibit gluconeogenesis with a nontoxic pharmaceutical carrier according to accepted procedures. Preferably the compositions will contain the active medicament in an amount of from about 50 mg. to about 1000 mg. per dosage unit.

The pharmaceutical carrier employed may be for, example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 g. If a liquid carrier is used, the preparation will be in the form of a syrup, emulsion, soft gelatin capsule, sterile injectable liquid such as an ampule or an aqueous or nonaqueous liquid suspension.

The pharmaceutical dosage unit forms described hereinabove exclude simple non-sterile solutions of the active medicament in water or in common organic solvents and exclude simple aqueous suspensions of the active medicament in the absence of a suspending agent.

The ability of the active medicaments of formula I to inhibit gluconeogenesis from lactate is measured in vitro using slices of both renal cortex and liver from fasted rats. For example, 3-thiolpicolinic acid reduces renal gluconeogenesis by 52% at a concentration of $1 \times 10^{-5}$ Molar and using liver slices produces an 82% inhibition at $1 \times 10^{-4}$ Molar. In the isolated perfused rat liver, at a concentration of $1 \times 10^{-4}$ Molar, inhibition is 40% when lactate is added as exogenous substrate.

The hypoglycemic activity is measured in the 48-hour-fasted, normal rat after a single dose of from 25 mg/kg to 300 mg/kg of a compound of formula I, administered orally or intraperitoneally. With 3-thiolpicolinic acid at oral doses of 25, 50 100 or 150 mg/kg there is a significant reduction in blood glucose, compared to the control animals, at one hour post-treatment. At 2 hours animals dosed with 25 mg/kg or 50 mg/kg recover and by the fifth hour animals treated with 100 mg/kg recover. Five hours post-treatment, animals dosed with 150 mg/kg continue to have a significantly reduced level of blood sugar.

Hypoglycemic activity in alloxan-diabetic rats of a number of compounds related to salicylic acid has been reported by V. S. Fang, *Arch. int. Pharmacodyn.*, 176, No. 1, 1968. However a compound reported therein to have significant hypoglycemic activity, namely 2-hydroxynicotinic acid, does not inhibit renal gluconeogenesis at a concentration of $1 \times 10^{-4}$ Molar and no hypoglycemic activity is seen at an oral dose of 150 mg/kg in normal, fasted rats.

The method in accordance with this invention comprises administering internally to an animal a compound of formula I above, usually combined with a pharmaceutical carrier, in an amount sufficient to inhibit gluconeogenesis. The active medicament will be administered in a dosage unit as described hereinabove. The route of administration may be orally or parenterally, the oral route being preferred. Depending on the particular animal and the degree of inhibition desired, a dosage of from about 25 mg/kg to about 300 mg/kg is administered 1 to 4 times daily. When the method described above is carried out hypoglycemic activity is produced with a minimum of side effects.

The pharmaceutical preparations are made following the conventional techniques of the pharmaceutical chemist involving mixing, granulating and compressing when necessary, or variously mixing and dissolving the ingredients as appropriate to the desired end product.

The following examples illustrate the preparation of compounds of formula I and incorporation into pharmaceutical compositions of this invention. As such,

EXAMPLE 1

To a solution of 22.8 g. of 3-aminopicolinic acid in 73 g. of water and 36 g. of concentrated hydrochloric acid is added 10.4 g. of sodium nitrite dissolved in a small quantity of water, at a temperature between −5° and −10°C. The resulting diazo compound is added dropwise, below 0°C., to a solution of 5.2 g. of powdered sulfur, 40 g. of crystalline sodium sulfide, 40 g. of water, 20 g. of 25% sodium hydroxide and 44 g. of ice. The mixture is then stirred at room temperature for four hours, acidified with hydrochloric acid (congo red paper) and the precipitate filtered. The precipitate is dissolved in cold sodium hydroxide solution to separate the sulfur and, after filtration, the mixture is acidified with hydrochloric acid as above. This precipitate is refluxed for two hours with 50% hydrazine hydrate (5 g. of solid per 100 ml. of 50% hydrazine). The mixture is evaporated to a small volume in vacuo and the residue is taken up in 250 ml. of water, adjusted to pH 3, boiled with charcoal, filtered and concentrated at a temperature below 30°C. in vacuo. On evaporation the product is obtained, 3-thiolpicolinic acid melting at 183°C.

EXAMPLE 2

To a mixture of 700 g. (4.75 m.) of 3-aminopicolinic acid hemihydrate, 2.3 l. of water and 1120 ml. of concentrated hydrochloric acid, stirred and cooled to −5°C., is added dropwise a solution of 373 g. (5.4 m.) of sodium nitrite in 525 ml. of water, at a temperature below 0°C., and stirring is continued for 30 minutes.

A solution is prepared by mixing 573 ml. of 50% sodium hydroxide solution with 2.5 l. of water, adding 1712 g. (7.2 m.) of sodium sulfide nonahydrate and 230 g. (7.2 m.) of sulfur and heating until solids are dissolved. To this solution, cooled to −2°C., is added the diazonium solution from above, maintaining the temperature between 0° and 5°C. The resulting mixture is stirred for 30 minutes at 2°-5°C., 6 l. of water is added and stirring continued for 30 minutes at ambient temperature. The reaction mixture is then heated on the steam bath for 30 minutes, cooled to room temperature and filtered. The cooled filtrate is acidified with concentrated hydrochloric acid to pH 1-2, chilled overnight and filtered. The solid is suspended in 5.5 l. of water, the pH is adjusted to 10 by the cautious addition of anhydrous sodium carbonate and the mixture is stirred for 15 minutes, then filtered. The filtrate is chilled, acidified to pH 1-2 with concentrated hydrochloric acid and filtered to give 3-thiolpicolinic acid, m.p. 177°-179°C.

EXAMPLE 3

A mixture of 800 mg. (5 mmole) of 3-thiolpicolinic acid in 50 ml. of 14% boron trifluoride/methanol is refluxed under nitrogen overnight. The methanol is evaporated and the residue is diluted with water. The aqueous solution is extracted with chloroform, dried and concentrated to give methyl 3-thiolpicolinate, m.p. 64°-66°C. after recrystallization from benzene/hexane.

The corresponding ethyl ester is described in *Ukr. Khim. Zh.*, 32 (12), 1306-10 (1966); Chem. Abs. 67, 3058 u.

EXAMPLE 4

To a stirred solution of 2 g. of sodium bicarbonate in 25 ml. of 5% sodium bicarbonate under nitrogen is added 2.3 g. (0.015 m.) of 3-thiolpicolinic acid, followed by the addition of 2 ml. of benzoyl chloride. The resulting mixture is stirred at room temperature for 2.5 hours, then filtered. The filtrate is diluted with chloroform and the pH is adjusted to 2-3 with concentrated hydrochloric acid. The aqueous phase is separated, extracted with chloroform and the extract is washed with water, dried and evaporated. The residue is recrystallized from carbon tetrachloride to give 3-benzoylthiopicolinic acid, m.p. 151°-152°C.

Similarly, reaction of 2.3 g. of 3-thiolpicolinic acid with 2 ml. of acetic anhydride as described above yields after workup, 3-acetylthiopicolinic acid, m.p. 114°-116°C.

EXAMPLE 5

To a stirred solution of 520 mg. (3.3 mmole) of 3-thiolpicolinic acid in 25 ml. of acetone and 25 ml. of 5% sodium carbonate containing 1 g. of solid sodium carbonate is added 1 ml. of benzyl chloride. The resulting solution is stirred under nitrogen for 20 hours at room temperature. The acetone is removed from the reaction mixture in vacuo and excess benzyl chloride is removed by extraction with chloroform. The aqueous phase is acidified to pH 2 with concentrated hydrochloric acid and the precipitate is filtered and washed with water to yield 3-benzylthiopicolinic acid, m.p. 154°-156°C. after recrystallization from ethanol.

3-Phenylthiopicolinic acid obtained from 3-aminopicolinic acid by diazotization and reaction with thiophenol is described in *J. Chem. Soc.*, 3905 (1954).

Reference may also be made to U.S. Pat. No. 3,553,203 for the preparation of thio substituted picolinic acids.

EXAMPLE 6

| Ingredients | Mg./Tablet |
| --- | --- |
| 3-Thiolpicolinic acid | 250 |
| Calcium sulfate, dihydrate | 150 |
| Sucrose | 25 |
| Starch | 15 |
| Talc | 5 |
| Stearic acid | 3 |

The sucrose, calcium sulfate and 3-thiolpicolinic acid are thoroughly mixed and granulated with hot 10% gelatin solution. The wetted mass is passed through a No. 6 mesh screen directly onto drying trays. The granules are dried at 120°F. and passed through a No. 20 mesh screen, mixed with the strach, talc and stearic acid, and compressed into tablets.

EXAMPLE 7

| Ingredients | Mg./Capsule |
| --- | --- |
| 3-Thiolpicolinic acid | 500 |
| Magnesium stearate | 5 |
| Lactose | 50 |

The above ingredients are screened through a No. 40 mesh screen, mixed and filled into No. 0 hard gelatin capsules.

What is claimed is:

1. A pharmaceutical composition having hypoglycemic activity, in dosage unit form, comprising a pharmaceutical carrier and an effective amount of 3-thiolpicolinic acid.

2. The pharmaceutical composition of claim 1 in which the amount of active medicament is from about 50 mg. to about 1000 mg.

3. The method of producing hypoglycemic activity in an animal in need thereof which comprises administering orally to said animal in an amount sufficient to produce said hypoglycemic activity the compound 3-thiolpicolinic acid.

4. The method of claim 3 in which the active medicament is administered in an amount from about 25 mg/kg to about 300 mg/kg.

5. The method of claim 4 in which the active medicament is administered 1 to 4 times daily.

* * * * *